United States Patent
Cosley et al.

[11] Patent Number: 6,104,921
[45] Date of Patent: Aug. 15, 2000

[54] COMMUNICATIONS MODULAR DOCKING STATION

[75] Inventors: Michael Robert Cosley, Crystal Lake, Ill.; Barry Joe Ethridge, Fort Worth; Larry Weldon Burton, Roanoke, both of Tex.

[73] Assignee: Marconi Communications Inc., Cleveland, Ohio

[21] Appl. No.: 08/949,829

[22] Filed: Oct. 14, 1997

[51] Int. Cl.$^7$ ........................................... H04B 1/08
[52] U.S. Cl. ..................... 455/349; 455/3.3; 455/3.1; 379/399; 348/839
[58] Field of Search ................. 455/3.1, 3.3, 4.1, 455/561, 347, 90, 349; 348/836, 843; 174/50; 379/325, 326, 328, 329, 330, 332, 399; 439/435, 76.1, 535, 638, 652

[56] References Cited

U.S. PATENT DOCUMENTS

| | | | |
|---|---|---|---|
| 5,572,348 | 11/1996 | Carlson et al. | 455/3.3 |
| 5,729,824 | 3/1998 | O'Neill et al. | 455/3.1 |
| 5,774,793 | 6/1998 | Cooper et al. | 455/418 |
| 5,790,651 | 8/1998 | Suzuki et al. | 379/327 |
| 5,907,614 | 5/1999 | Bergstrom et al. | 379/399 |

*Primary Examiner*—Reinhard J. Eisenzopf
*Assistant Examiner*—Greta J. Fuller
*Attorney, Agent, or Firm*—Jones, Day, Reavis & Pogue

[57] ABSTRACT

A novel communications modular docking station receives information related to one or more types of services and forwards information to one or more subscriber destinations. The communications modular docking station includes a housing and a single coaxial line-in on the housing for receiving the service information from an optical node in communication with a central office and for receiving power from a power hub. The communication modular docking station is engageable with a module having a flange which can be slidably received in a slot on the communications modular docking station. The slot is at least partially defined by a wall which limits the distance the flange can be slid along the slot. The module is secured to the communications modular docking station by a securing member which is received in a bore on the wall of the communications modular docking station. Within the housing is a communicator, and on the housing is a line-out. The communicator has a communications port and an extension port, and the communications port is communicatingly connected to the module for receiving information from the module and the extension port is communicatingly connectable to the one or more subscriber destinations for forwarding the information received from the module. The line-out on the housing is capable of sending information and power to a second communications modular docking station. Preferably, the communications modular docking station has one or more securing members for fixedly securing the communications modular docking station to a grounding structure.

20 Claims, 4 Drawing Sheets

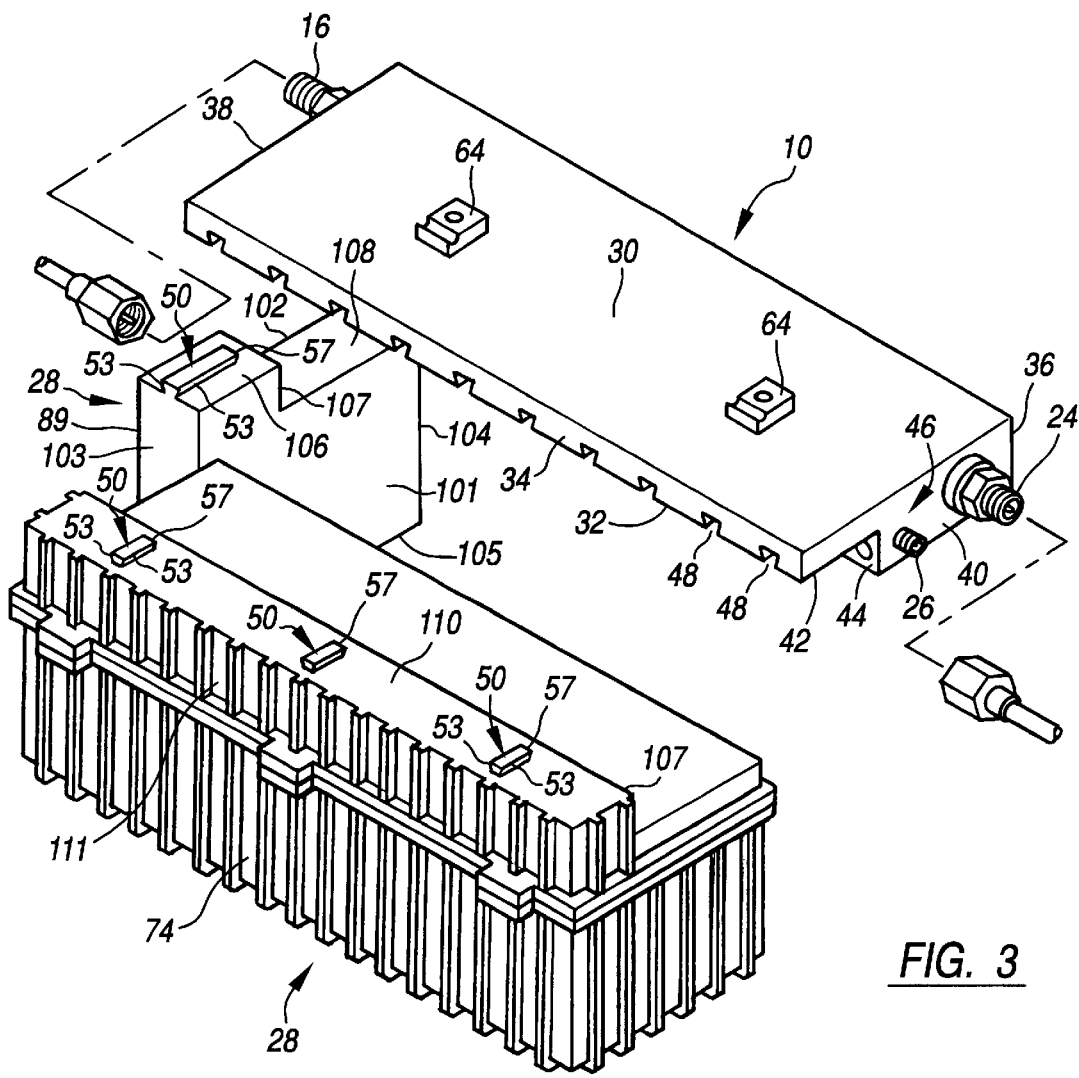
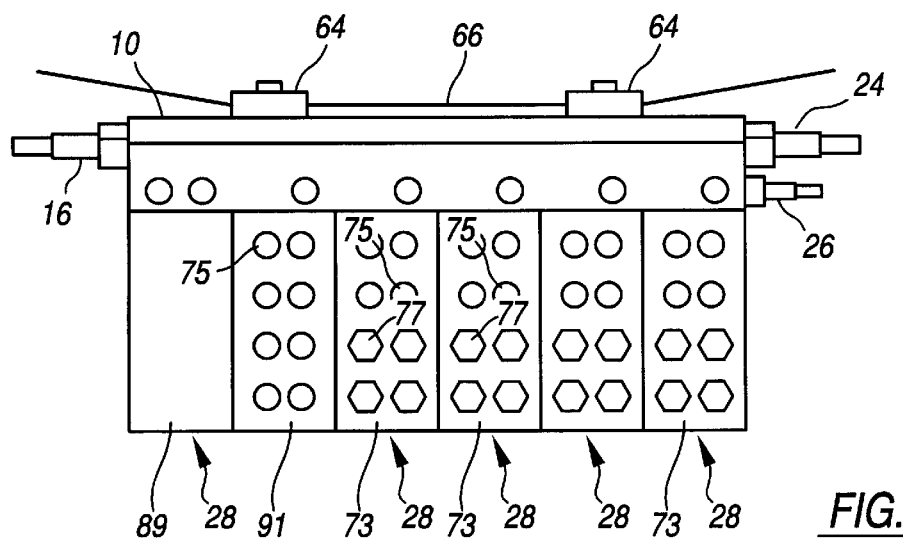
FIG. 3
FIG. 4

COMMUNICATIONS MODULAR DOCKING STATION

BACKGROUND OF THE INVENTION

The present invention relates generally to devices within communications networks, and more specifically to a novel communications modular docking station for distributing information related to one or more types of services, such as cable television, telephone and data communications, to one or more subscriber destinations.

Typically, a communications network relates to a single type of service. For example, a first communications network may provide cable television to a number of different households. A second communications network separate from the first communications network may provide telephone service to a number of different households. Still a third and separate communications network may provide data communication services to a number of different households. As a result of having three, separate, communications networks provide the three different services, extensive hardware is necessary. Additionally, a single household receiving all three services typically needs three different inputs in order to receive each of the three different services.

A modular docking station may comprise a component within a communications network. Since the communications network relates to a single service, the modular docking station can receive and distribute information relating to only a certain type of service. Past modular docking stations have included a plurality of lines in. For example, at the least, the modular docking station would have a line-in for power and one or more independent lines-in for receiving information related to the particular service defined by the communications network. As a result of having several lines-in, the modular docking station presents several disadvantages. For example, it has been necessary to provide an intricate network overlay in order to transmit the power and service information to the modular docking station. Additionally, it can prove tedious to accurately connect the many communication lines to the many lines-in of the modular docking station. Providing a substantially improved communications modular docking station is desirable.

The present invention is directed to substantially eliminate the disadvantages and difficulties discussed hereinabove.

OBJECTS AND SUMMARY OF THE INVENTION

Accordingly, it is a general object of the present invention to provide a novel communications modular docking station which can receive and distribute information related to one or more different types of services, such as cable television, telephone and data communications.

Another object of the present invention is to provide a communications modular docking station which can be effectively implemented within one or more communications networks relating to a plurality of different types of services.

Still another object of the present invention is to provide a communications modular docking station having a single line-in capable of receiving both service information and power from at least one external source.

By the present invention, it is proposed to overcome the difficulties encountered heretofore. To this end, the present invention provides a novel communications modular docking station for distributing information related to one or more types of services, such as cable television, telephone and data communications, to a plurality of modules and for sending information to one or more subscriber destinations. The communications modular docking station includes a housing; a line-in on the housing capable of receiving the service information and power from at least one external source; a communicator within the housing; means on the housing for engaging the modules in communication with the communicator, where the communicator can distribute the service information to the modules; and means on the housing for engaging the communication modular docking station in communication with the one or more subscriber destinations, where the communications modular docking station can send information to the one or more subscriber destinations.

A preferred embodiment of the present invention provides a novel modular communications network including a housing engaged with a module for receiving information related to one or more types of services and for forwarding information to one or more subscriber destinations. The housing includes a coaxial line-in which is in communication with a communicator for receiving the service information from an optical node in communication with a central office and for receiving power from a power hub. The housing also includes at least one slot for slidably receiving a respective flange of a module, and the slot is at least partially defined by a wall which limits the distance the flange can be slid along the slot. The module is secured to the housing by a securing member received in a bore on the wall of the housing. The communicator is mounted within the housing, and the communicator has a communications port and an extension port. The communications port of the communicator is communicatingly connected to the module for receiving information from the module, and the extension port of the communicator is communicatingly connectable to the one or more subscriber destinations for forwarding the information received from the module to the one or more subscriber destinations. The housing also includes a line-out connected to the communicator which is capable of sending information and power to a second housing. Preferably, the housing also has one or more securing members for fixedly securing the housing to mounting structure, such as to a wire.

BRIEF DESCRIPTION OF THE DRAWINGS

The organization and manner of the structure and operation of the invention, together with further objects and advantages thereof, may best be understood by reference to the following description, taken in connection with the accompanying drawings, wherein:

FIG. 3 is an exploded, perspective view of the communications modular docking station, stand-alone module and modular box shown in FIG. 2;

FIG. 4 is a front view of the communications modular docking station shown in FIG. 2 illustrating aerial securement and several engaged stand-alone modules in place of the modular box shown in FIG. 2;

DETAILED DESCRIPTION OF THE PREFERRED EMBODIMENT

Figure 1:
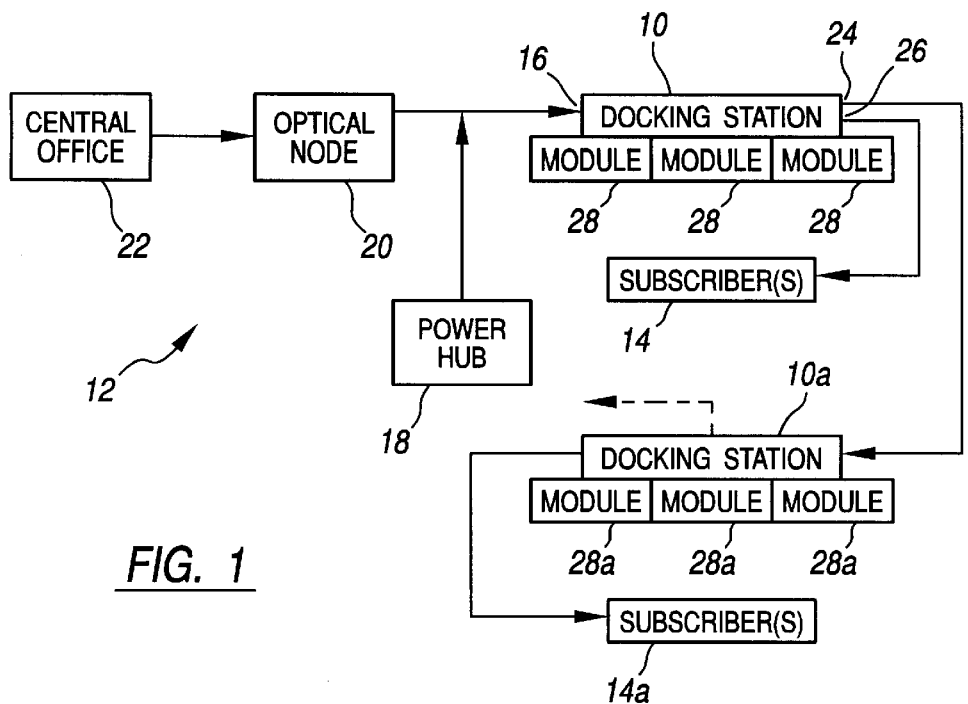
FIG. 1 is a schematic diagram of a novel communications modular docking station having features in accordance with the present invention implemented within a novel modular communications network.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Shown in the drawings is a novel communications modular docking station 10 according to the present invention. As shown in FIG. 1, the communications modular docking station 10 is implemented within a communications network 12. The communications modular docking station 10 is used to distribute information related to one or more types of services, such as cable television, telephone and data communications, to one or more subscriber destinations 14. To this end, as shown in FIGS. 1–4 and 6, the communications modular docking station 10 has a single line-in 16 capable of receiving service information, such as radio frequency (rf) signals, relating to one or more types of services, and power from at least one external source. For example, as shown in FIG. 1, the power received by the communications modular docking station 10 through the line-in 16 is power from a power hub 18. Also, the service information received through the line-in 16 is, as shown in FIG. 1, from an optical node 20 which is communicatingly connected to a central office 22 where the central office 22 sends out information signals, such as radio frequency (rf) signals, relating to one or more types of services. The services to which the service information relates may include such services as, for example, CATV, telephony, digital video or data communication services. Regardless from where the communications modular docking station 10 receives service information and power, preferably the communications modular docking station 10 receives both service information and power through the single line-in 16. To this end, the line-in 16 may be a coaxial line in.

Additionally, as shown in FIGS. 1–4 and 6, the communications modular docking station 10 has a line-out 24 for forwarding the power and/or the service information received through the line-in 16, as shown in FIG. 1, to a second communications modular docking station 10a which is structured much like the first communications modular docking station 10. Alternatively, the line-out 24 of the first communications modular docking station 10 can be communicatingly connected to the subscriber destinations 14 without the provision of a second communications modular docking station 10a. However, as shown in FIG. 1, it is preferred that the first communications modular docking station 10 have the line-out 24 communicatingly connected to the other communications modular docking station 10a, and be provided with an extension port 26 for forwarding service information and/or power to the subscriber destinations 14. Similar to the line-in 16 of the communications modular docking station 10, each of the line-out 24 and the extension port 26 may comprise a coaxial line. The second communications modular docking station 10a may have its line-out 24a communicatingly connected to a third communications modular docking station (not shown) and the third communications modular docking station may be communicatingly connected to a fourth, and so on. Because it is envisioned that each modular communications docking station be structured like the first, only the first communications modular docking station 10 will be described in detail.

Figure 6:
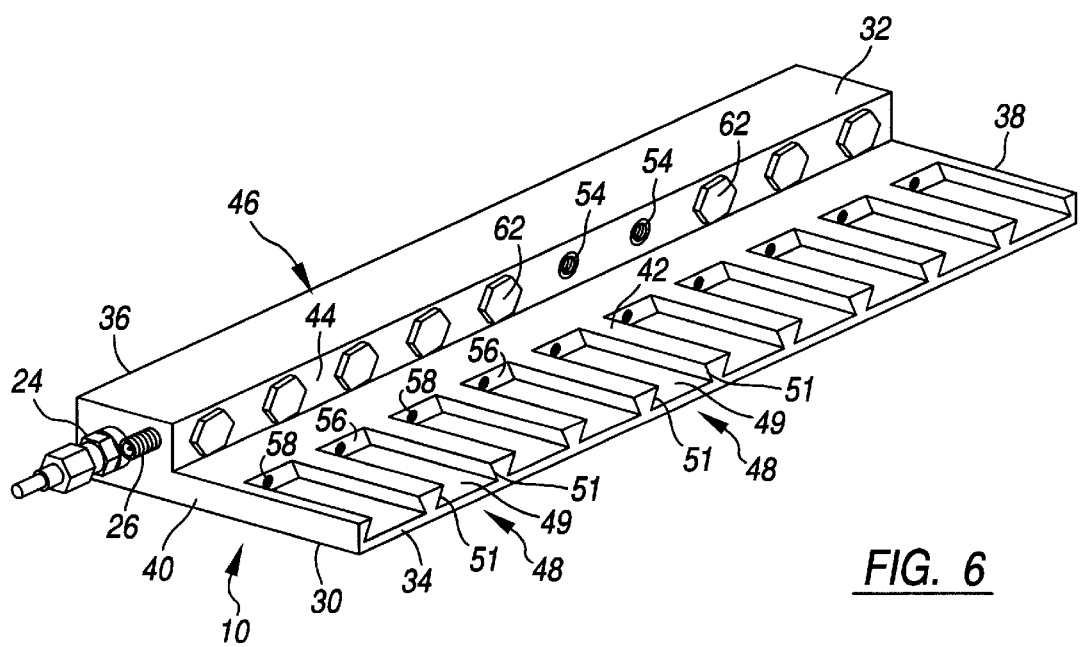
FIG. 6 is a perspective, bottom view of the communications modular docking station shown in FIGS. 1–5 illustrating slots and communication ports.

As shown most clearly in FIGS. 3 and 6, the communications modular docking station 10 includes a housing 46. The housing 46 has top and bottom walls, 30 and 32, respectively, both of which are preferably substantially planar. The housing 46 also includes a substantially planar front wall 34 and a parallel, opposing substantially planar back wall 36 both of which are connected with, and perpendicular to, the top wall 30 of the housing 46. The bottom wall 32 of the housing 46 connects to the back wall 36 at an end of the housing 46 opposite the top wall 30. Substantially planar left and right end walls, 38 and 40, respectively, depend from, and are perpendicular to, the top wall 30. As shown, the line-in 16 is provided through the end wall 38, and the line-out 24, as well as the extension port 26, are provided through the other, opposite end wall 40. These locations, however, of the line-in 16, line-out 24 and extension port 26, are not imperative to the present invention.

As shown most clearly in FIG. 6, a communicating wall 44 is connected with, and perpendicular to, the bottom wall 32 of the housing 46. The module engaging platform 42 intersects both the communicating wall 44 and the front wall 34 of the housing 46 at a right angle. The communicating wall 44 and a module engaging platform 42 are formed on the housing 46 between the end walls 38 and 40 and between the bottom wall 32 and the front wall 34. As a result, the communicating wall 44 and the module engaging platform 42 connect the bottom wall 34 and the front wall 34 of the housing 46.

The module engaging platform 42 includes a plurality of module slots 48 thereon for engaging the housing 46 with one or more modules 28 as shown in FIGS. 2, 4, 5 and 7. The modules 28 are more fully described herein. As shown in FIG. 6, each of the module slots 48 on the module engaging platform 42 is defined by a top wall 49, which is parallel to the top wall 30 of the housing 46, and by opposing, inwardly angled walls 51 which intersect the top wall 49 of the slot 48. Each of the module slots 48 starts with an opening in the front wall 30 of the housing 48 and ends with a positive stopping wall 56 having a threaded bore 58 thereon. As shown, the positive stopping wall 56 of each slot 48 spans the distance between the opposing angled walls 51 of the slot 48.

As mentioned, perpendicular to, and connected with, the module engaging platform 42 is the communicating wall 44. As shown in FIG. 6, the communicating wall 44 includes a plurality of communications ports 54 which communicate with a communicator 68, such as a bus, which is mounted within the housing 46. Each communications port 54 on the communicating wall 44 is adjacent to an associated module slot 48 on the module engaging platform 42.

Figure 7:
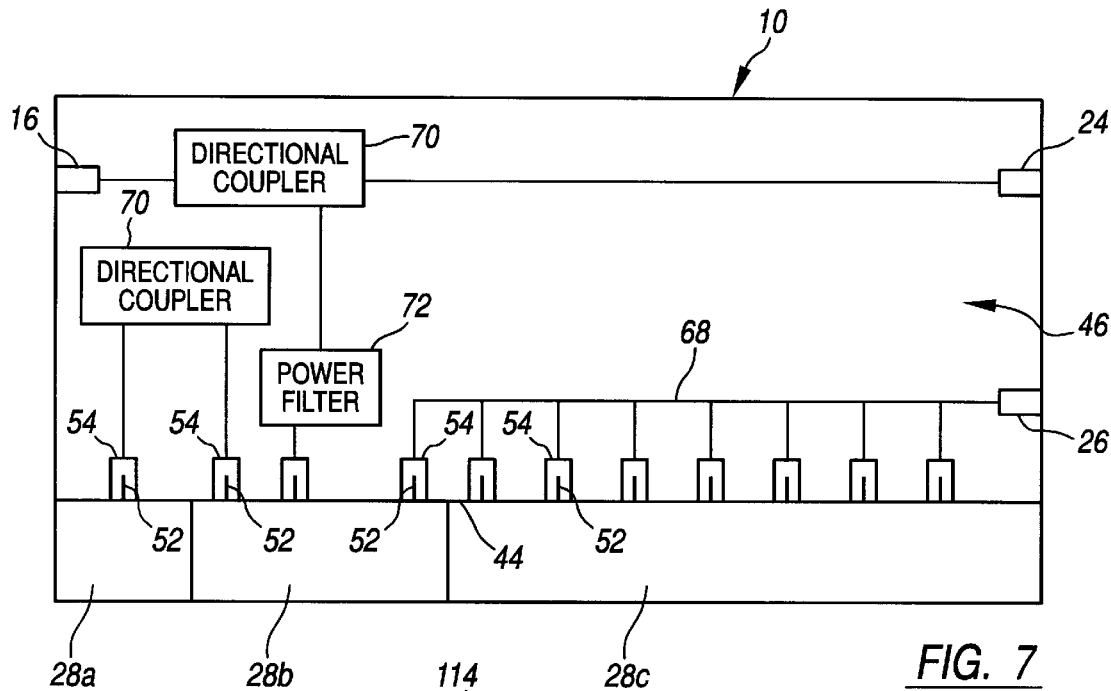
FIG. 7 is a schematic view of the communications modular docking station shown in FIGS. 1–6 illustrating exemplary communication routes and three engaged modules in place of the stand-alone module and module box shown in FIGS. 2 and 3; and, FIG. 8 is a perspective view of the module box shown in FIGS. 2 and 3 illustrating the module box in an open position to provide access to a circuit card mounted therein.

In addition to the communicator 68, as shown in FIG. 7, also provided within the housing 46 are one or more directional couplers 70 and a power filter 72 which are interconnected between the line-in 16 and the line-out 24 of the communications modular docking station 10. The directional couplers 70 set attenuation which can be preconfigured, or set in the field which simplifies the network build. The directional couplers 70, power filter 72, and the communicator 68 can communicate information to the modules 28 through the communications ports 54 in the communicating wall 44 of the housing 46. The communicator 68 can also communicate through the extension port 26 through the end wall 40 of the housing 46 to the subscriber destinations 14. As a result, information and power received from the line-in 16 can be transmitted to the modules 28 by the communicator 68 when the modules 28 are engaged with the communications modular docking station 10 as shown in FIGS. 2, 4, 5 and 7. Additionally, the communicator 68 can transmit information to the subscriber destinations 14.

The communications modular docking station 10 is provided with structure for fixedly securing the communications modular docking station 10 to a grounding structure. As shown in FIGS. 2–5, securing brackets 64 are provided on the top wall 30 of the housing 46 such that the communications modular docking station 10 can be aerially suspended to a wire 66 as shown in FIG. 4, or to a pedestal. Alternatively, the communications modular docking station 10 can be pedestal mounted, low profile mounted or flush-to-grade mounted using the securing brackets 64 shown. Alternatively, the communications modular docking station 10 can be pole mounted using a standard "T" bracket (not shown) or wall mounted using a custom bracket (not shown). Other means for fixedly securing the communications modular docking station 10 are within the knowledge of one having ordinary skill in the art.

As shown in FIG. 6, the communications modular docking station 10 is provided with structure to protect the communications ports 54 when a communications line 52 is not engaged therewith. As shown, caps 62 are provided for securement over the unused communications ports 54. It should be recognized that caps 62 can also be provided to protect the line-in 16, line-out 24, and extension port 26 of the communications modular docking station 10.

As mentioned hereinabove, the communications modular docking station 10 can effectively receive information related to one or more types of services and distribute information to one or more subscriber destinations 14. This is achieved by engaging a plurality of modules 28 with the communications modular docking station 10 as shown in FIGS. 2, 4, 5 and 7. When a module 28 is engaged, the module 28 can communicate with the communicator 68 within the housing 46 through a communications port 54. The structure of the modules 28 as well as the manner in which they are engaged with the communications modular docking station 10 are now be described.

Shown in FIGS. 2, 3, 4, 5, 7 and 8 are several different types of modules 28 which can be engaged with the communications modular docking station 10. As shown in FIGS. 2, 3, 4 and 5, one type of module 28 which can be engaged with the communications modular docking station 10 is module 89. While other types of modules 28 will be described later herein, the specific engagement of module 89 with the communications modular docking station 10 will now be described since engagement of any of the different types of modules 28 with the communications modular docking station 10 is achieved in much the same manner as module 89.

Figure 5:
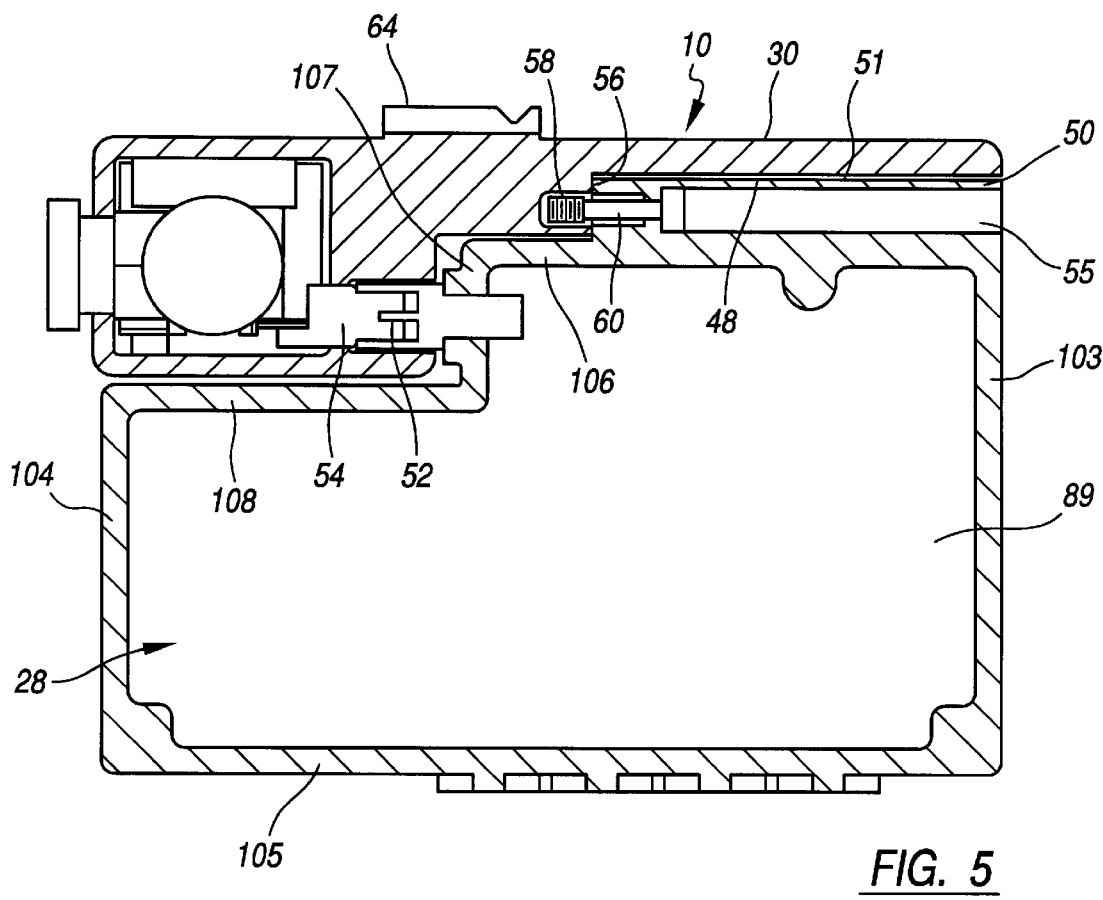
FIG. 5 is a side sectional view, taken along line 5—5 of FIG. 2, of the communications modular docking station illustrating a positive stop and a locking mechanism of the communications modular docking station.

As shown in FIGS. 3 and 5, module 89 has opposing, parallel side walls 101 and 102, which are connected with, and perpendicular to, opposing, parallel front and back walls, 103 and 104. A bottom wall 105 of the module 89 is connected to the side walls, 101 and 102, and to the front and back walls, 103 and 104. A top wall 106 of the module 89 is connected with, and is perpendicular to, the side walls, 101 and 102, and the front wall 103. Depending from, and perpendicular to, the top wall 106, is a line-carrying wall 107. A support wall 108 of the module 89 connects the line-carrying wall 107 and the back wall 104. Extending from the line-carrying wall 107 is a communications line 52, and on the top wall 106 of the module 89 is an engaging flange 50 which is formed by a top wall 57 and angled side walls 53. The engaging flange 50 is shaped to fit into a module slot 48 in the module engaging platform 42 of the communications modular docking station 10. As shown in FIG. 5, the engaging flange 50 has a bore 55 therethrough, and a threaded screw 60 is insertable into the bore 55 so that the threaded screw 60 is received by the threaded bore 58 in the positive stopping wall 56 which defines the back of the module slots 48. When inserted into the bore 55 of the engaging flange 50 and screwed into the threaded bore 58 on the positive stopping wall 56, the threaded screw 60 secures the module 89 to the communication modular docking station 10 and prevents easy removal of the module 89 from the communications modular docking station 10. To remove the module 89, a user needs to insert a suitable tool, such as a screwdriver or an Allen wrench, into the bore 55 of the engaging flange 50 and interact with the threaded screw 60 to disengage the threaded screw 60 from the threaded bore 58 on the positive stopping wall 56. Once this is done, the user can remove the module 89 by placing his or her hand therebehind and pulling.

When the module 89 is engaged with communications modular docking station 10 by engaging the engaging flange 50 with the module slot 48, the communications line 52 on the line-carrying wall 107 of the module 89 engages a communications port 54 on the housing 46 of the communications modular docking station 10. This engagement of the communications line 52 and the communications port 54 allows that the communicator 68 and the module 89 to communicate. Also, when the module 89 is engaged with the communications modular docking station 10, the positive stopping wall 56 of the module slot 48 limits the amount of travel of the engaging flange 50 within the slot 48 and provides an indication to the assembler that the module 89 is fully engaged with the communications modular docking station 10. This is important in order to protect the communication port 54 from damage because over-engagement of the module 89 may damage the communications port 54 on the communications modular docking station 10.

Regardless of the type of module 28 which is engaged with the communications modular docking station 10, the module 28 has one or more communication lines 52 for engaging one or more communications ports 54 when the module 28 is engaged with the communications modular docking station 10. Additionally, regardless of the type of module 28, the module 28 has one or more engaging flanges 50 which slide into a module slot 48 on the modular engaging platform 42 to provide engagement of the module 28 with the communications modular docking station 10.

Other types of modules 28 are now discussed. One type of module 28 which may be engaged with the communications modular docking station 10 is module 73 shown in FIG. 4. In addition to having a communications line (not shown) which engages with a communications port 54 on the communications modular docking station 10, as described above with relation to module 89, module 73 also has inputs 75 and outputs 77 which enable the module 73 to receive and distribute information, respectively, outside the communications modular docking station 10 in addition to communicating with the communications modular docking station 10.

Another type of module 28 which can be engaged with the communications modular docking station 10 is module 91 which is also shown in FIG. 4. Module 91 has inputs 75 which enable the module 91 to receive information from outside the communications modular docking station 10. Still yet another type of module 28 which may be engaged is a module having only outputs which enable the module to communicate information outside the communications modular docking station 10 in addition to being able to communicate with the communications modular docking station 10 through the communications line (this particular type of module is not shown in the drawings).

Figure 2:
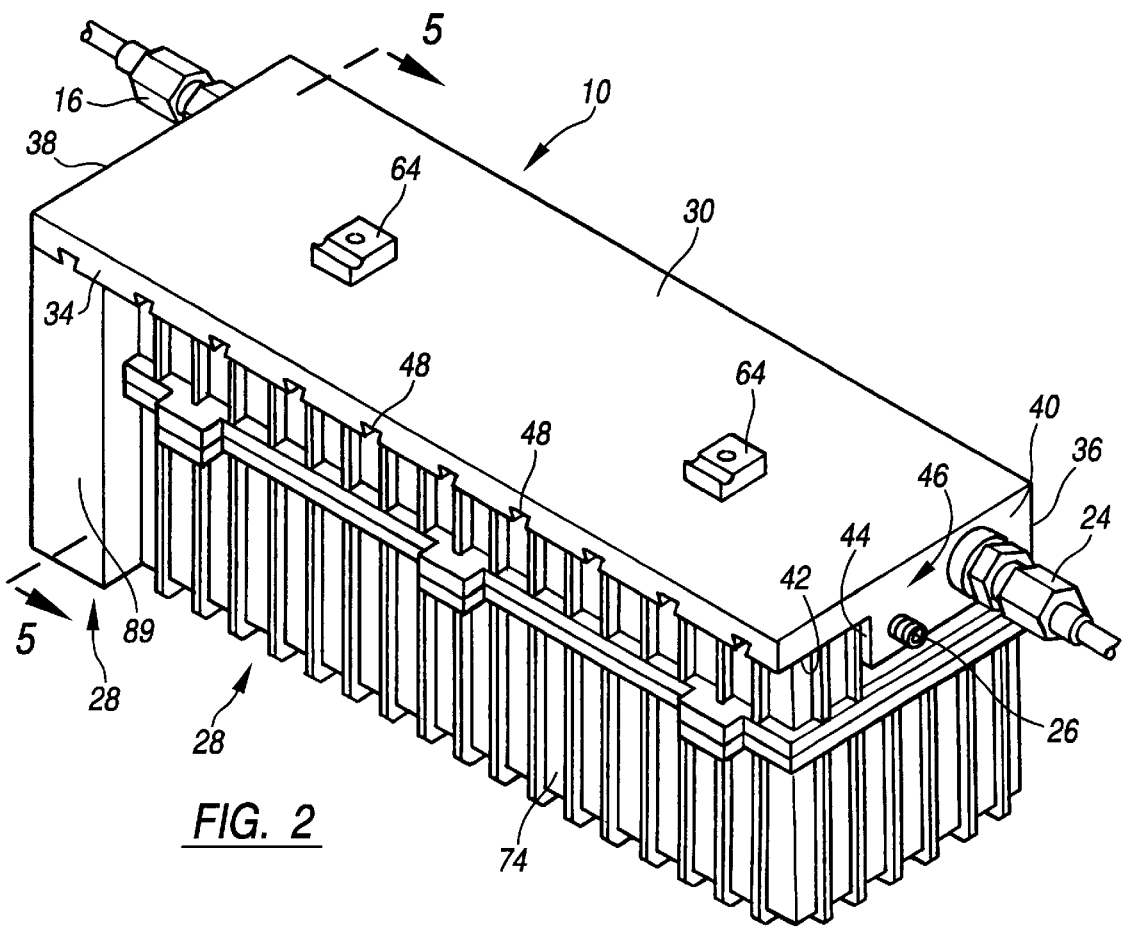
FIG. 2 is a perspective view of the communications modular docking station shown schematically in FIG. 1 illustrating a stand-alone module and a modular box engaged with the communications modular docking station.
Figure 8:
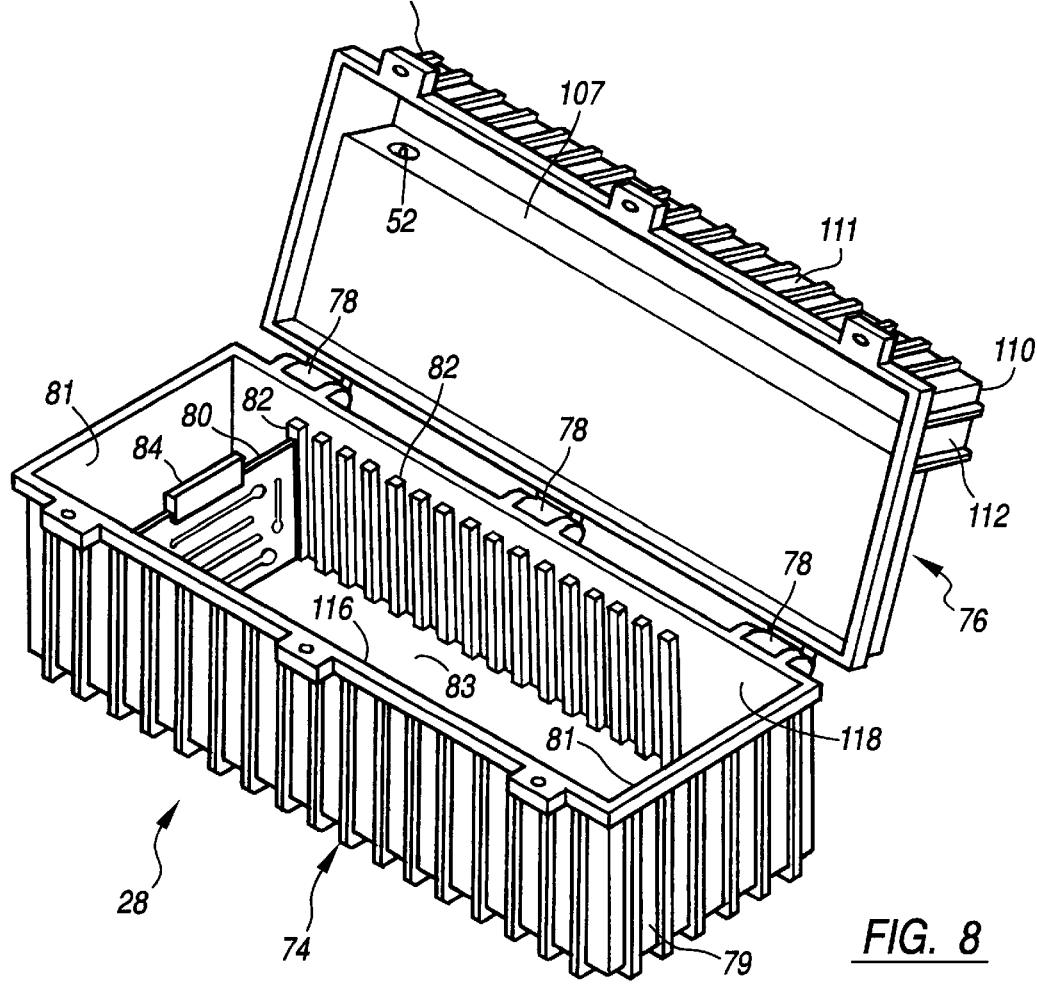

Still yet another type of module 28 which may be engaged with the communications modular docking station 10 is a modular box 74, as shown in FIGS. 2, 3 and 8. As shown in FIG. 8, the modular box 74 has a top 76 which is connected to a bottom, enclosing structure 79 at hinges 78 so that the top 76 can be pivoted about the hinges 78 to allow access into the enclosing structure 79 of the modular box 74. As shown, the top 76 includes a top wall 110 which, as shown in FIG. 3, has engaging flanges 50 thereon much like as was described with relation to module 89. Additionally, as shown in FIG. 8, connected with, and perpendicular to, the top wall 110 is a line-carrying wall 107 which has a communications line 52 thereon much like as was described with relation to module 89. Depending from the top wall 110, and parallel to the line-carrying wall 107 of the top 76 of the modular box 74, is a front wall 111. Side walls 112 and 114 of the top 76 connect the front wall 111 to the line-carrying wall 107, and depend from the top wall 110 of the top 76 of the modular box 74. The enclosing structure 79 of the modular box 74 is defined by opposing parallel side walls 81 which connect a front wall 116 to an opposing back wall 118 of the enclosing structure 79. Interconnecting the side walls 81 and the front and back walls 116 and 118 of the enclosing structure 79 is a bottom wall 83. The top 76 of the modular box 74 and the enclosing structure 79 of the modular box 74 maintain the modular box 74 in a substantially enclosed position when the top 76 is positioned about the hinges 78 such that the front wall 111 of the top 76 is contacted against the front wall 116 of the enclosing structure 79. However, as shown, one or more circuit cards 80 may be mounted in slots 82 within the enclosing structure 79; therefore, access into the enclosing structure 79 may desired in order to interact with the one or more circuit cards 80. Therefore, the top 76 of the modular box 74 may be swung open to provide access into the enclosing structure 79, as mentioned above.

Shown in FIG. 7 is an exemplary configuration of modules 28a, 28b and 28c and the communications modular docking station 10. This exemplary configuration will now be described in order to explain, among other things, the functioning of the communicator 68 when modules are engaged with the communications modular docking station 10. Module 28a of FIG. 7 would be able to communicate with the line-in 16, the line-out 24 and with the module 28b. In addition, module 28b would be able to communicate with the line-in 16, the line-out 24, and both modules 28a and 28c. Module 28b would be able to communicate with module 28c through the communicator 68. Module 28c would also be able to communicate with module 28b through the communicator 68. Additionally, module 28c would be able to communicate with the extension port 26 through the communicator 68. Therefore, the communicator 68 within the housing 46 of the communications modular docking station 10 allows the line-in 16, the line-out 24, the extension port 26 as well as any engaged modules 28 to transmit and receive information to and from each other.

While FIG. 7 shows module 28a being in communication with a single communications port 54, module 28b being in communication with three communications ports 54, and module 28c being in communication with a plurality of communication ports 54, the scope of the present invention is not meant to be limited by this configuration and, as mentioned, FIG. 7 merely depicts an exemplary configuration of modules to the communications modular docking station 10.

Preferably both the modules 28 and the communications modular docking station 10 are comprised of a sturdy material, such as metal or a hard plastic, thus permitting the communications modular docking station 10 and the modules 28 to effectively withstand exposure to the elements when located outdoors and, in effect, be weatherproof, without the need for any type of separate weatherproof enclosure. This provides that the communications modular docking station 10 can be mounted to a outside wire 66, as mentioned hereinabove. This would eliminate the bulky and expensive packaging of current network equipment.

While a preferred embodiment of the present invention is shown and described, it is envisioned that those skilled in the art may devise various modifications of the present invention without departing from the spirit and the scope of the appended claims.

The invention claimed is:

1. A communications modular docking station for distributing information related to one or more types of services to a plurality of modules and for sending information to one or more subscriber destinations, said communications modular docking station comprising:

a housing;

a line-in on said housing capable of receiving the service information and power from at least one external source;

a communicator within said housing;

means on said housing for engaging the modules in communication with said communicator, wherein said communicator can distribute the service information to the modules; and means on said housing for engaging said communication modular docking station in communication with the one or more subscriber destinations, wherein said communications modular docking station can send information to the one or more subscriber destinations.

2. The communications modular docking station defined in claim 1, further comprising means on said housing for securing the modules to said communications modular docking station.

3. The communications modular docking station defined in claim 1, further comprising an extension port on said housing for forwarding information from the communicator to the one or more subscriber destinations.

4. The communications modular docking station defined in claim 1, further comprising a line-out on said housing capable of sending information and power to a second communications modular docking station.

5. The communications modular docking station defined in claim 1, wherein said means on said housing for engaging the modules comprises slots for slidably receiving flanges on the modules, wherein each of said slots is at least partially defined by a wall which limits the distance the flange on the module can be slid into said slot.

6. The communications modular docking station defined in claim 1, wherein said housing has communication ports connectable to the modules enabling the communicator and the modules to communicate therebetween.

7. The communications modular docking station defined in claim 6, further comprising caps securable over said ports to protect said ports from damage when modules are not connected to said ports.

8. The communications modular docking station defined in claim 1, further comprising means for fixedly securing said communications modular docking station to a grounding structure.

9. The communications modular docking station defined in claim 1, wherein said line-in on said housing comprises a coaxial line-in.

10. In combination, a communications modular docking station and at least one module, said communications modular docking station being capable of communicating information related to one or more types of services to said module when said module is communicatingly connected thereto and said communications modular docking station being capable of distributing at least a portion of the information to one or more subscriber destinations, wherein said communications modular docking station comprises:
a housing;
a line-in on said housing capable of receiving service information and power from at least one external source;
a communicator within said housing; and
means on said housing for engaging said communicator in communication with one or more subscriber destinations, wherein said communicator can send information to the one or more subscriber destinations, and
wherein said at least one module is communicatingly connectable to said communications modular docking station.

11. The combination defined in claim 10, wherein said communications modular docking station further comprises means on said housing for securing said module to said housing.

12. The combination defined in claim 10, wherein said communications modular docking station further comprises an extension port on said housing for forwarding information from the communicator to the one or more subscriber destinations.

13. The combination defined in claim 10, wherein said communications modular docking station further comprises a line-out on said housing capable of sending information and power to a second housing.

14. The combination defined in claim 10, wherein said communications modular docking station further comprises a slot on said housing for slidably receiving a flange on said module, wherein said slot is at least partially defined by a wall which limits the distance said flange on said module can be slid into said slot.

15. The combination defined in claim 10, wherein said communicator is communicatingly connectable to said module and the one or more subscriber destinations.

16. The combination defined in claim 15, wherein said communicator has at least one port connectable to said module.

17. The combination defined in claim 16, wherein said communications modular docking station further comprises a cap securable over said port to protect said port from damage when said module is not connected to said port.

18. The combination defined in claim 10, wherein said communications modular docking station further comprises means for fixedly securing said housing to a grounding structure.

19. The combination defined in claim 10, wherein said line-in on said housing comprises a coaxial line-in.

20. In combination, a communications modular docking station and at least one module, said communications modular docking station being capable of communicating information related to one or more types of services to said module when said module is communicatingly connected thereto and said communications modular docking station being capable of distributing at least a portion of the information to one or more subscriber destinations, wherein said communications modular docking station comprises:
a housing;
a coaxial line-in on said housing for receiving the service information from an optical node in communication with a central office and for receiving power from a power hub;
a communicator having a first port and a second port, wherein said first port is communicatingly connected to the module for receiving information from the module, and wherein said second port is communicatingly connectable to one or more subscriber destinations for forwarding said information received from the module to the one or more subscriber destinations;
a line-out on said housing capable of sending information and power to a second housing; and,
one or more securing members on said housing for fixedly securing said housing to a grounding structure; and
wherein said at least one module is communicatingly connectable to said communications modular docking station.

* * * * *